July 15, 1952 — C. H. ISAACS — 2,603,330
SHAFT CONTROLLING MECHANISM
Filed Aug. 29, 1947 — 7 Sheets-Sheet 1

Inventor
CHARLES H. ISAACS
By Hyman Hurwitz
Attorney

July 15, 1952

C. H. ISAACS 2,603,330

SHAFT CONTROLLING MECHANISM

Filed Aug. 29, 1947

Inventor
CHARLES H. ISAACS

By Hyman Hurwitz

Attorney

July 15, 1952  C. H. ISAACS  2,603,330

SHAFT CONTROLLING MECHANISM

Filed Aug. 29, 1947  7 Sheets-Sheet 3

Inventor
CHARLES H. ISAACS

By Hyman Hurwitz
Attorney

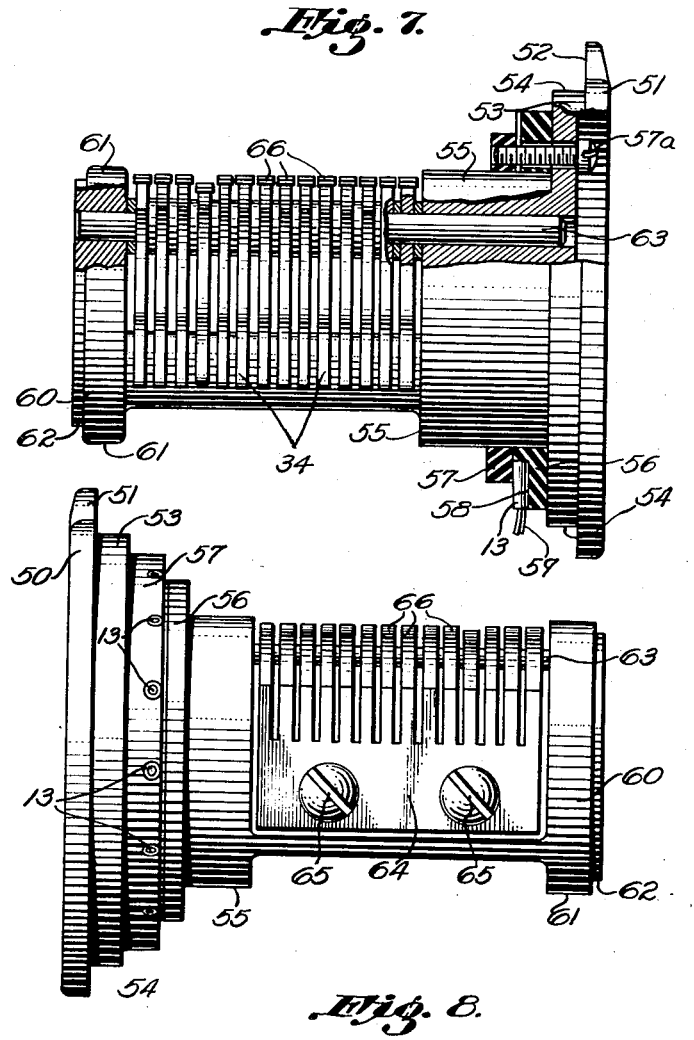

July 15, 1952 — C. H. ISAACS — 2,603,330
SHAFT CONTROLLING MECHANISM
Filed Aug. 29, 1947 — 7 Sheets—Sheet 5

Inventor
CHARLES H. ISAACS
By Hyman Hurwitz
Attorney

July 15, 1952 C. H. ISAACS 2,603,330
SHAFT CONTROLLING MECHANISM
Filed Aug. 29, 1947 7 Sheets-Sheet 6
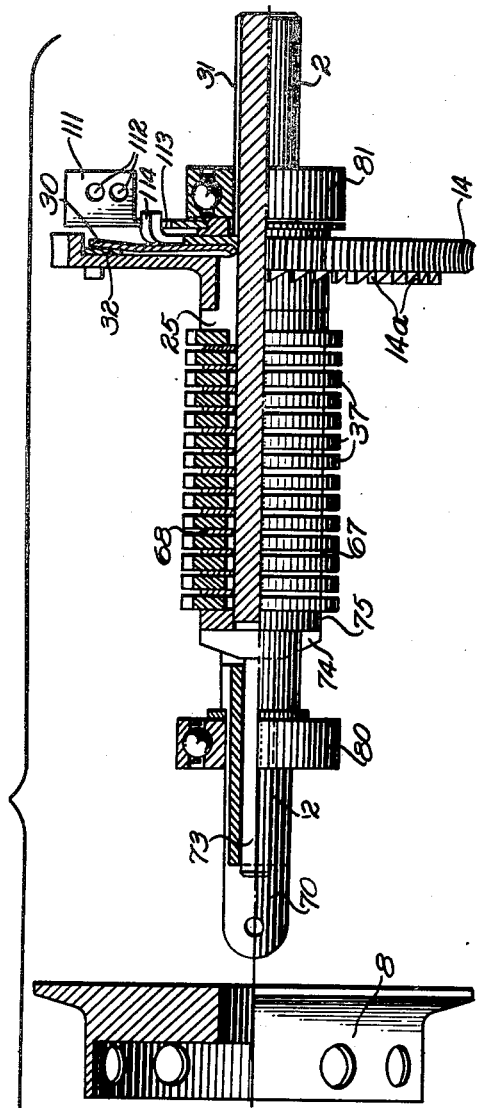
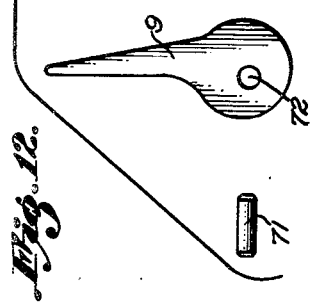
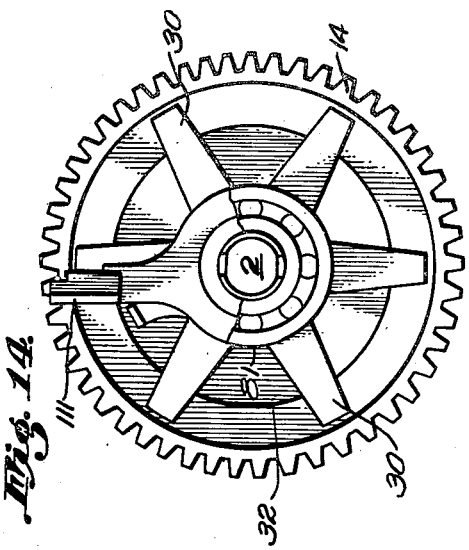
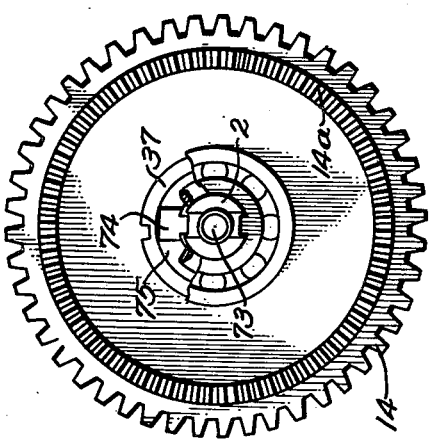
Inventor
CHARLES H. ISAACS
By Hyman Hurwitz
Attorney

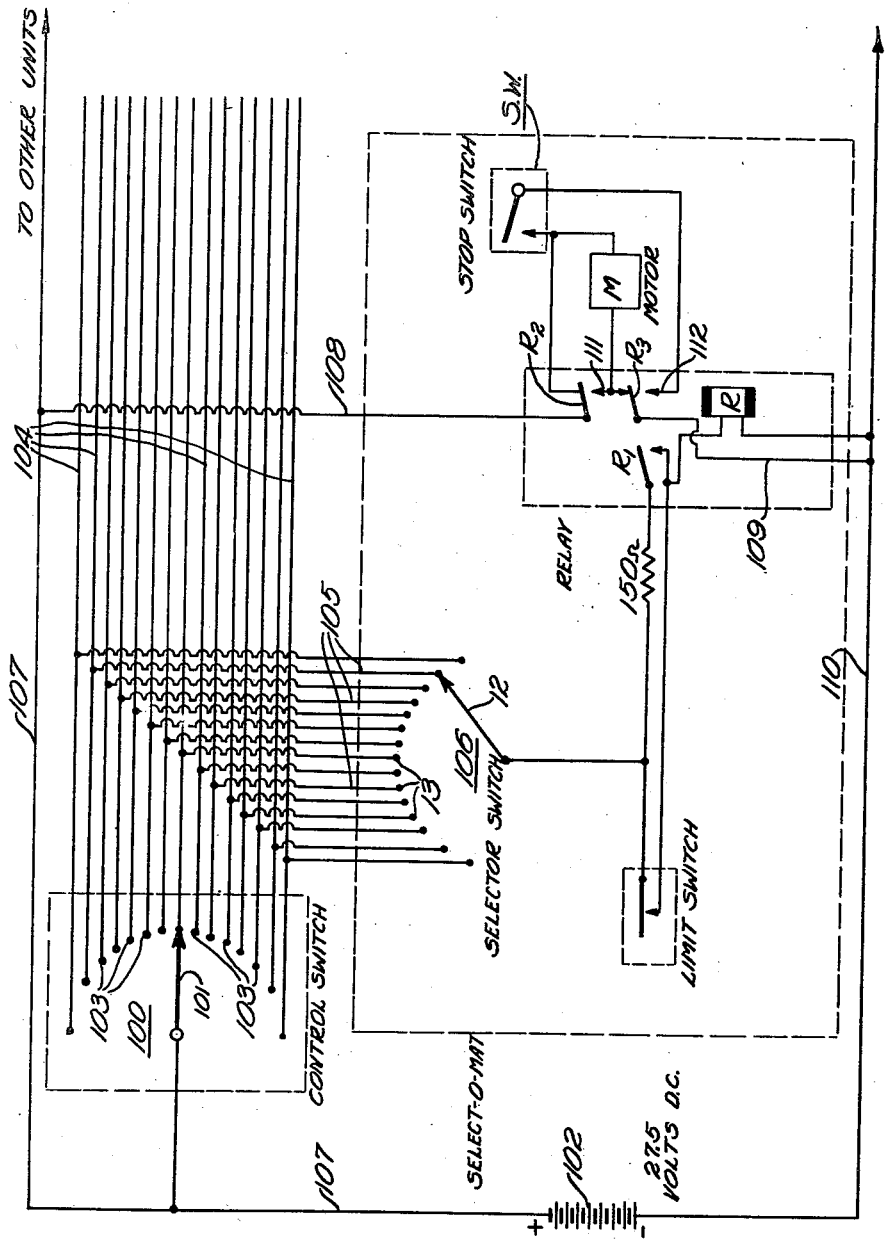

Patented July 15, 1952

2,603,330

UNITED STATES PATENT OFFICE 2,603,330

SHAFT CONTROLLING MECHANISM

Charles H. Isaacs, Arlington, Va., assignor to Melpar, Inc., Washington, D. C., a corporation of New York Application August 29, 1947, Serial No. 771,373

3 Claims. (Cl. 192—142)

This application discloses an improvement of a prior application for U. S. patent filed in the name of William L. Worthen, Serial No. 698,607, filed September 23, 1946, and assigned to the assignee of the present application.

This invention relates generally to control devices and more particularly to devices for controlling the position of a shaft from a remote position.

It is an object of the invention to provide a shaft positioning device of compact and carefully integrated character, which shall require less space and weight than similar devices, in the prior art.

It is a further object of the invention to provide a selective positioning device for positioning a shaft to any selected one of a plurality of preselected positions, with extreme accuracy of position duplication.

It is another object of the invention to provide, in a remotely controlled selective positioning system for shafts, a novel torque responsive switch for controlling various cycling operations of the system.

It is still another object of the invention to provide a remote positioning device adapted remotely for controlling radio equipments, and which is particularly adapted by reason of its compact design, slight weight, and small number of parts to reliable operation aboard aircraft, and the like, where space and weight requirements must be kept at a minimum with no loss of reliability.

It is still another object of the invention to provide a remotely controlled selective shaft positioning mechanism which operates in a predetermined cycle of events for each positioning operation, and wherein the time required for completion of the cycle of events is minimized without sacrifice of reliability and accuracy of the mechanism.

Still further objects, advantages and features of the invention will become apparent upon study of the following detailed description of a specific embodiment thereof, especially when taken in conjunction with the accompanying drawings, wherein:

Figure 7 is a view in side elevation of a sub-assembly, which appears otherwise in the assembly illustrated in Figure 5, and in the sectional view therethrough of Figure 6;

Figure 8 is a view in side elevation of the structure of Figure 7, as viewed from the opposite hand;

Figure 12 is an exploded view, partly in longitudinal section, of a further sub-assembly of the invention, taken on the line 12—12 of Figure 6;

Figure 13 is a view in side elevation, taken from the left in Figure 12;

Figure 14 is a view in side elevation, taken from the right in Figure 12;

Figure 17 is a schematic circuit diagram of the electrical wiring of the control circuits of the invention.

Figure 1:
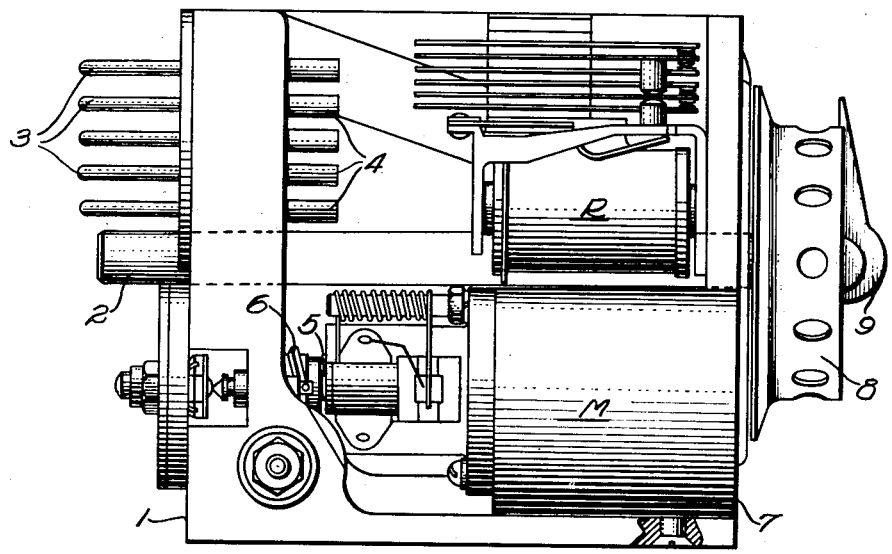
Figure 1 is a view in side elevation of a specific embodiment of the present invention, disclosing the physical arrangement of various parts thereof.
Figure 2:
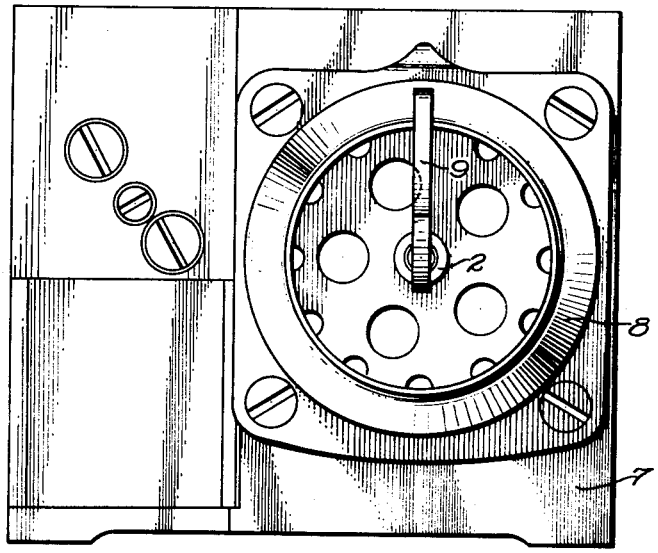
Figure 2 is a view, in front elevation, of the device of Figure 1.

Briefly described, the present invention is adapted to position a shaft to any one of a number of preselected positions in response to a remote controlling action accomplished by a multi-position selector switch. The shaft position corresponding with each switch position of the selector switch may be predetermined at will, by a simple manual selection of a shaft position, followed by a locking operation, and thereafter selection of that switch position will be followed by automatic, rapid and accurate duplication of the predetermined shaft position.

In the present embodiment of the invention provision is made for a total of fourteen predetermined shaft positions, in response to selection of fourteen switch positions. Additionally, means are provided in response to selection of still another control switch position, to permit manual control of shaft position, independently of the normal action of the position control mechanism. It is to be understood, however, that the system lends itself readily to providing more or less than fourteen preselectable shaft positions, by suitable redesign of the system, and without departing from the mode of operation and the constructional features which provide the essence of the present invention.

Systems for accomplishing the above-described functions have been constructed heretofore, and are known in the prior art. The present invention relates to improvements in such systems, whereby they may be rendered more compact, lighter, more efficient, more accurate, less liable to maintenance requirements, more economical of fabrication, simpler in construction, and generally more effective. To this end resort has been had to a concentric type of construction, involving a rotatable outer selector cam drum assembly which is positionable by means of a motor and which performs a pawl selection function, the selector cam drum assembly performing its pawl selecting function under control of a multi-position selector switch.

A pawl assembly, comprising a plurality of spring pressed pawls, is mounted interiorly of and co-acts with the selector cam drum assembly, the construction and arrangement of the pawl assembly being such that the pawls remain stationary and are selected for a shaft locking operation in accordance with the position assumed by the cam drum sub-assembly under control of the selector switch. Internally of both the drum and the pawl assemblies is located a main shaft to which is secured a selector ring assembly and various drive and control mechanisms. The main shaft is the shaft referred to hereinabove, and which is to be positioned by the device. The selector ring sub-assembly comprises a plurality of lock discs mounted concentrically with the shaft and which may be rotated freely about the shaft and with respect to each other, for purposes of predetermination of shaft positions, and which may be clamped fast to the shaft thereafter and during a shaft selecting cycle. Each of the lock discs is provided with a notch adapted to be secured by one of the pawls to which reference has heretofore been made. After a pawl has been selected by the selector cam drum assembly in the course of a shaft position selecting cycle, the main shaft assembly is rotated relative to the pawl assembly by means of a slipping or friction clutch, until the notch in that lock disc which aligns with the selected pawl is opposite the head of the selected pawl, whereupon the disc is locked by the pawl against further motion, the shaft being then positioned.

Whereas, in the Worthen application Serial No. 698,607, with respect to which this application discloses an improvement, the various steps in the cycle of operations of the shaft positioning device of the invention are controlled by means of a cycling switch, which enforces a definite cycle of operations on the device and which requires time for its completion after the shaft has been positioned, in the present improvement this is true only in part, and after a shaft positioning operation is completed and in response to such completion, the drive motor is deenergized and the cycle of operations is then completed. In the present improvement, moreover, the cycling switch is entirely dispensed with, successive operations taking place in response to the completions of definite steps in the cycle of operations, and in response to such completions.

The shaft may be coupled mechanically to mechanisms of any character which it is desired to position. A preferred application of the present invention relates to the tuning of radio transmitters and/or receivers to preselected frequencies, the positionable shaft being coupled mechanically to the shaft of a tuning element; it will be realized, however, that other applications of the invention will suggest themselves to those skilled in the arts appertaining thereto, and it is believed that the invention will find wide application to a large number of diverse industrial functions.

Referring now to the drawings, and particularly to Figure 1 thereof, there is illustrated, in side elevation, the embodiment of my invention specifically described herein, a side wall of the device having been removed to enable inspection of the interior arrangement. Projecting rearwardly of the rear casing wall 1 is a main shaft 2 which is to be positioned, the prongs 3 representing contacts of a male cable connector of conventional character, and which extend interiorly of the wall 1 to provide contacts 4 to which various control wires are connected and which in turn lead to stationary selector contacts of a motor control circuit to be described hereinafter. Voltage may be applied to any selected one of the prongs 3 by means of a remote manually operable selector switch (Figure 17), thereby to energize a selected one of the motor control contacts (Figure 7). Drive power for the shaft 2 is provided by a reversible motor M over a motor shaft 5 to which is secured a worm gear 6, all of which will be described more in detail hereinafter. Over the motor M is provided a multi-contact relay R, which operates to control various motor control circuits. A specific description of the functions of relay R will be provided in conjunction with the description of the circuit diagram of Figure 17, hereinafter. The forward wall 7 of the device is provided with a dial 8, which is secured to the main shaft 2, the latter extending through the entire device, and the dial 8 serving to position the shaft manually and to preselected positions which the device may automatically repeat.

Secured to the shaft 2 in an axial slot therein is a disc lock cam lever 9, which serves to release and lock the position selector discs mentioned above.

The specific arrangement of parts and the positioning and details of construction thereof, as described hereinabove, have been selected and designed with extreme care with a view to realizing compactness and lightness, without loss of accessibility.

Figure 3:
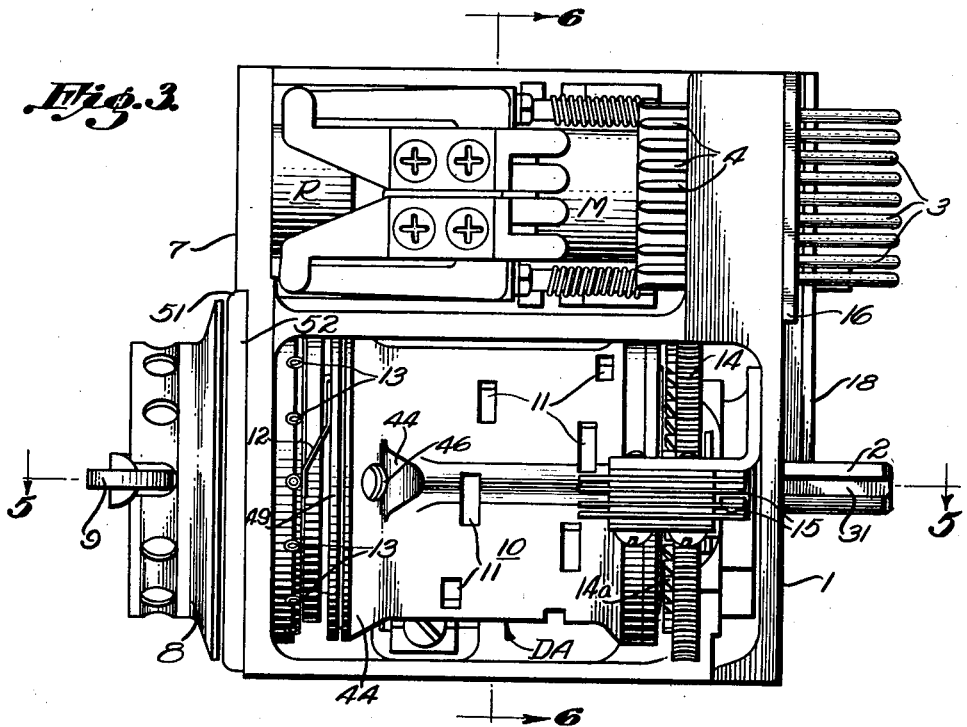
Figure 3 is a plan view of the invention, in assembled form.

Figure 3 is a plan view of the invention showing the relay R, the motor M, the prongs 3 exteriorly of the wall 1, and the contacts 4 interiorly thereof, the positionable shaft 2, the dial 8 and the cam lever 9. There are further visible in Figure 3 the selector cam drum 10, having therein pawl selector apertures 11, and a wiping finder contact 12 which is secured to and rotates with the drum 10 and which contacts in succession the drum position determining contacts 13, which are connected respectively to the contacts 4, in an effort to find a live one of contacts 13. Also illustrated in Figure 3 is the main drive gear 14 for the drum 10, to which is secured a ratchet wheel 14a, forming an element of a one way clutch, the pawl cooperating with the teeth of the ratchet wheel 14a being secured to the drum 10 and serving to drive the latter always in but one direction.

The limit switch contacts 15 are actuated at a predetermined zero position of the main shaft 2 by means of a radial member secured to the main shaft 2, and serve as a zero limit switch L. S. for the shaft 2.

Figure 4:
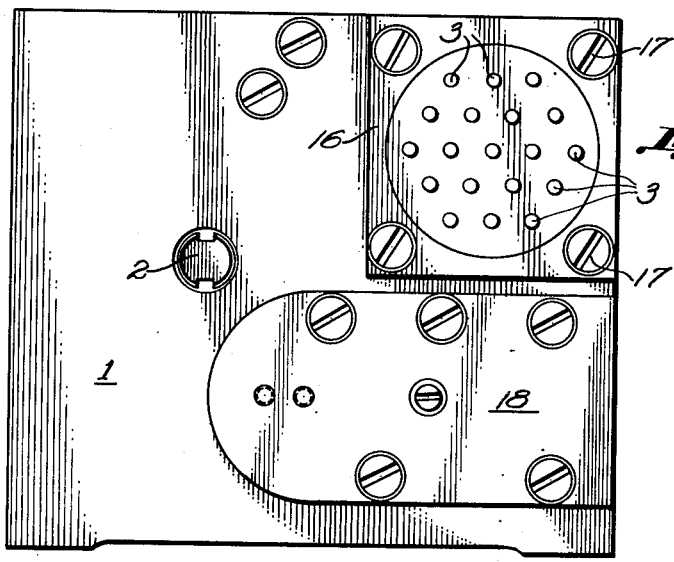
Figure 4 is a view in rear elevation of the invention.

The Figure 4 of the drawings illustrates in rear elevation the position of the main shaft 2 and of a male cable connector 16, with its prongs 3, which is secured to the rearward wall 1 by screws 17. The numeral 18 identifies a cover plate for providing access interiorly of the device.

Figure 5:
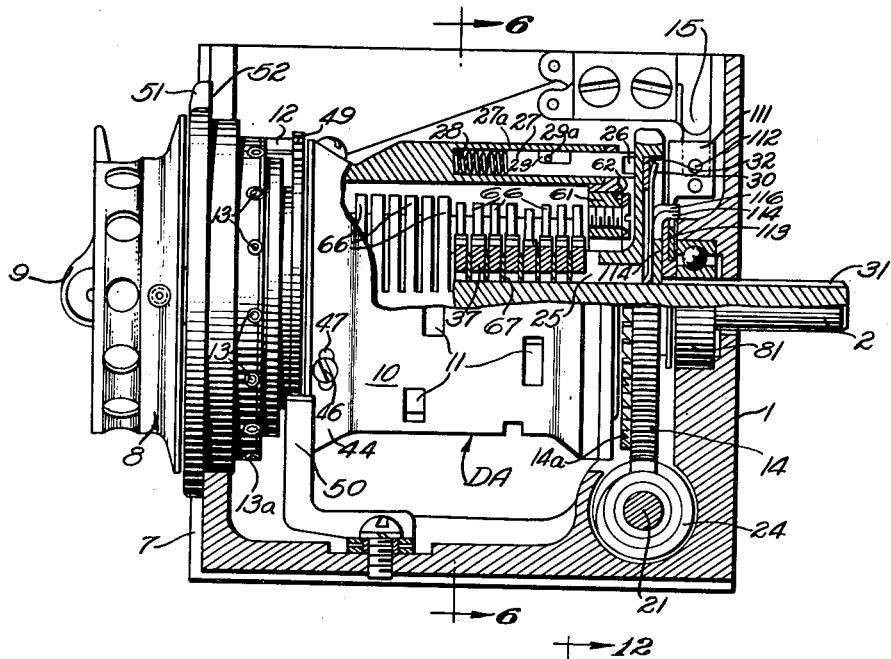
Figure 5 is a view partly in transverse section taken in a vertical plane on the line 5—5 of Figure 3.
Figure 6:
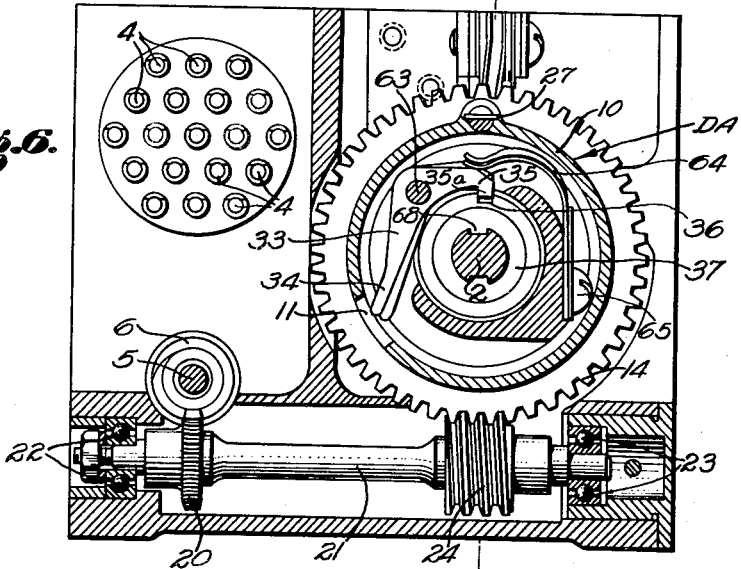
Figure 6 is a view in transverse section taken in a vertical plane on the lines 6—6 of Figure 3 and 6—6 of Figure 5.

Turning now to Figures 5 and 6, the drive shaft 5 of the reversible drive motor M is shown, to which is secured the helical or worm gear 6, which meshes with and serves to drive a gear 20, the latter being secured, in any convenient manner, to a jack shaft 21 which extends at right angles to the motor shaft 5. The jack shaft 21 extends between a pair of bearings 22, 23 secured to or mounted on opposite side walls of the housing which serves to contain the mechanisms involved in the system of the invention. While the specific character of the bearings 22 and 23 forms no part of the present invention, they are preferably so constructed as to prevent axial motion of the jack shaft 21, in known manner.

Secured to the jack shaft 21 in any convenient manner is a further worm gear 24 which serves to transmit motion to the shaft positioning mechanism proper by way of the main drive gear 14.

As will appear further when the circuit diagram of Figure 17 is explained in detail, selection of shaft positions is controlled by a manual selector switch having a plurality of contacts, each of the contacts corresponding with a shaft position which may be predetermined. Upon actuation of the selector switch to initiate a shaft positioning operation, the motor M is energized and caused to rotate in a direction such as to cause counterclockwise rotation of the main drive gear 14 as viewed in Figure 6. The gear 14 is mounted for rotation on an annular member or hub 25 which may be integral with the main shaft 2. Secured to the forward face of the gear 14 is an annular ratchet wheel 14a, which serves as a one way clutch for transmitting motion between the main drive gear 14 and the selector cam drum sub-assembly DA, comprising the selector cam drum 10, by means of a spring pressed pawl 26 which is formed by milling, at an angle to the longitudinal axis thereof, one end of a sliding rod 27. The rod 27 nests internally of an aperture 27a in an enlargement of the wall of the casting forming the sub-assembly 10 and is pressed outwardly against the ratchet wheel 14 by means of a helical spring 28 located within the said aperture. Rotation of the rod 27 is prevented by providing the rod 27 with a slot 29 across which extends a pin 29a. The slot 29 is of sufficient length to permit axial motion of the rod 27 for a distance adequate to enable slipping of the pawl 26 over the teeth of the ratchet wheel 14a when the main drive gear 14 is driven in a reverse direction, the teeth of the ratchet wheel 14a then sliding over the milled end of rod 27.

In one direction of rotation of the gear 14, specifically counterclockwise as seen in Figure 6, some one of the teeth formed in the periphery of the ratchet wheel 14a engages the spring pressed pawl 26 to drive the drum assembly DA. In the opposite direction of rotation of the gear 14, on the other hand, and specifically clockwise as viewed in Figure 6, the pawl 26 rides over the teeth of the ratchet wheel 14a and no mechanical coupling is provided.

The gear 14 further drives the main shaft 2 over a friction clutch comprising a spider 30 formed of six resilient arms, one of which projects within a slot 31 in the shaft 2 whereby to prevent relative motion of the spider 30 and of the shaft 2. The spider 30 presses against an annular ring 32, which is fabricated of friction material, and which constitutes a clutch disc, the ring 32 being secured to one face of the gear 14. The arms of the spider 30 taken in conjunction with the clutch disc 32 provide a frictional or slipping bi-directional clutch for transmitting motion between the gear 14 and the shaft 2, and serves to drive the main shaft 2 to a preselected position, at which position the shaft 2 is locked by means to be described hereinafter, and the disc 32, continuing its motion, slides over the spider arms 30 to enable completion of a cycle of operations of the device.

The selector cam drum sub-assembly DA which was heretofore referred to as being driven by the main drive gear 14 by means of a unidirectional clutch comprising the ratchet wheel 14a and the pawl 26 may comprise a hollow, unitary aluminum drum 10 of generally cylindrical shape both externally and internally. The drum 10 is illustrated in longitudinal section in Figure 9 and by reference to Figures 5, 6, and 9 may be seen the relative locations and the structure of the series of pawl selector apertures 11 which function to select one of a series of shaft locking pawls 33, each having a tail portion 34 adapted to fall within one of the apertures 11, and each having a head portion 35, provided with a radial lug 35a which is adapted to fall within a radial slot 36 of a position selector disc 37 secured to shaft 2. Each pawl selector aperture 11 is arranged to occupy approximately $\frac{1}{15}$ of the total internal periphery of the drum 10, and the apertures 11 are displaced with respect to one another about the periphery of the drum 10 by a distance equal to $\frac{1}{15}$ of the length of the inner periphery. Since each aperture occupies approximately $\frac{1}{15}$ of the inner periphery and there being provided in all 14 such apertures, and further in view of the stated relative peripheral displacements of the apertures, it will be clear that there remains about the periphery of the drum 10 a portion having an angular extent of approximately $\frac{1}{15}$ of the total periphery, which is devoid of apertures, the purpose of which will appear hereinafter.

The structure as shown does not provide for any simple law of arrangement of the apertures 11, and proceeding longitudinally of the cylinder, successive apertures 11 occupy at random any one of the 15 angular segments of which the drum 10 may be considered to be constituted, except that segment to which no apertures are allocated.

One possible arrangement of the apertures 11 is a helical disposition thereof, each succeeding aperture 11 occupying a position adjacent to the preceding, both axially and angularly. Such a disposition is not, however, essential to the operation of the device, nor even desirable, because it weakens the structure, and merely represents one possible arrangement of the apertures 11 alternative to that actually utilized.

Figure 10:
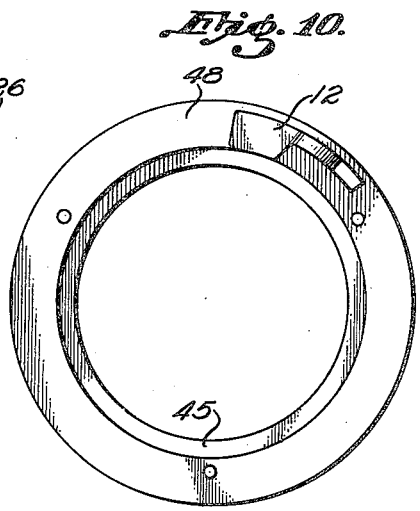
Figure 10 is a view in elevation corresponding with Figure 9, as viewed from the left of that figure.
Figure 11:
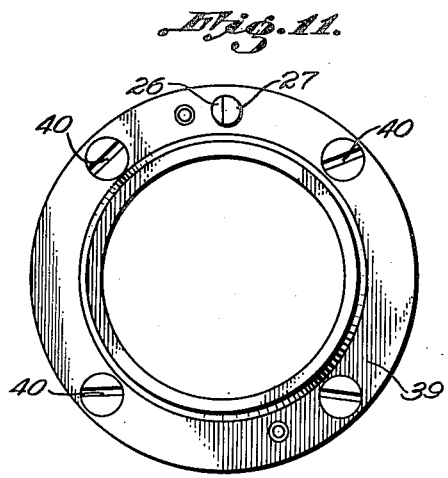
Figure 11 is a view in elevation of the sub-assembly of Figure 9, as viewed from the right in that figure.

The drum 10 is provided (see Figures 9–11, inclusive) with a pair of end assemblies 38 and 39. The assembly 39 is secured immovably to one end of the drum 10 by means of bolts 40 (Figure 11) and is provided with an aperture through which may extend the sliding rod 27.

A further end assembly 38 is provided for the drum 10 and which fits adjustably within a flared out end 44 of the drum 10, being constructed roughly in the shape of a frustro-cone, for that purpose. The end assembly 38 comprises a ring 45, fabricated of electrical insulating material, which is secured to the drum 10 by means of several set screws 46, which threadedly engage the ring 45, each extending freely through a slot 47 in the drum 10. Thereby, when the screws 46 are loosened, the ring 45 may be adjusted in angular position with respect to the drum 10, for a purpose which will become evident as the description proceeds. Secured to the ring 45 at its base is a metal plate 48, which carries an annular metal ring 49 at its periphery, to which is soldered or otherwise secured the wiping finder contact 12. The ring 49 constitutes a slip ring, on which rides a brush 50, which thereby is connected electrically at all times with the finder contact 12 and in any position occupied by the latter.

The drum 10 accommodates internally thereof a pawl assembly, illustrated in Figures 7 and 8, which comprises a unitary casting which may be inserted within the housing of the device through an aperture in the front wall thereof, the annular extension 51 of the casting remaining externally of the casing and having a wall 52 which lies flat against front wall 7. There is further provided a shoulder 53 having a surface 54 which is machined to fit snugly within the aperture in the front wall 7 and which is cut down in diameter to form a bearing surface 55 for the drum 10. A pair of annular clamping rings 56 and 57 which are fabricated of insulating material fit on the bearing surface 55 and are clamped by means of a series of set screws 57a passing through the ring and through the ring 56 and threadedly engaging the ring 57. The ring 56 is provided with a series of equally spaced radial apertures 58 having sufficient depth to extend below the peripheral surface of the ring 57 and within which may be located the drum positioning contacts 13, the contacts 12 being clamped in place by tightening on the screws 57. From each of the contacts 13 extends a lead 59, and there being fifteen contacts 13, fifteen corresponding leads are provided which extend to fifteen contacts 4 of the connector 16 located in the wall 1 of the device. The selector cam drum 10 is provided with a wiping finder contact 12 which contacts with successive ones of the drum position determining contacts 13 as the casting 10 rotates. The pawl assembly further comprises a rearward annular shoulder 60 which provides a further bearing surface 61 for the selector cam drum assembly and is further provided with a reduced annular portion 62 at its extreme end which provides a thrust bearing for the selector drum assembly.

Intermediate the bearing surfaces 54 and 61, the pawl assembly casting is cut away to provide operating space for the shaft locking pawls 33 which are mounted on a cross pin 63, and an axial cylindrical aperture is provided through the pawl assembly for accommodating the main shaft 2 and the various selector discs 37. The pawl assembly is further provided with a spring assembly 64 which is secured to the pawl assembly casting by means of screws 65, there being a total of fifteen spring arms 66 extending from the spring assembly 64, each being positioned in a manner adequate to exert continuous pressure on the heads 35 of the pawls 33, and the pawls 33 being shaped substantially with head 35 and tail 34 at right angles to one another and the supporting pin 63 being positioned intermediate the head 35 and the tail 34. The pressure of the springs 64 tends to force the tails 34 within the apertures 11 in the selector cam drum 10. The shape of the pawls 33 is clearly shown in Figure 6 of the drawings, each comprising a head or locked portion 35 having at one extremity thereof a generally radially extending locking lug 35a, slightly tapered and a further tail or camming portion 34 adapted to engage an aperture 11 of the selector drum assembly or to slidingly engage the inner periphery of the drum assembly. A pawl 33 is provided in association with each of the shaft position selector discs 37, the latter being illustrated in Figure 12, and by reference to Figure 6 the position of two pawls will be evident, one of the pawls, that labeled 34, being shown to have its locking lug 35a engaging a slot 36 in a selector disc 37 and having its tail 34 locked within one of the apertures 11 and the other having its tail 34 riding on the normal inner periphery of the assembly 10. Since the pawl selector apertures 11 are displaced with respect to one another angularly about the periphery of the assembly 10, while the pawl tails 34 are in longitudinal alignment, it is clear that in no circumstances can more than a single pawl 34 be engaged with its associated aperture 11 at any one time.

Rotatively mounted on the main shaft is a plurality of shaft position selector discs 37, the discs being axially spaced so that one of the discs 37 may be associated with each one of the pawls 34. The discs 37 are separated by thin spacer discs or washers 67, the latter being of smaller diameter than the discs 37 to avoid interference with the locking lugs 25a, and each spacer disc 67 being provided with a key 68 for interlocking with the keyway 31 of the main shaft 2, whereby the shaft 2 and the spacer discs 37 are rendered incapable of relative rotation but are capable of slight relative axial motion. The position discs 37, on the other hand, may be quite free to rotate on the shaft 2 when released for such rotation by a locking mechanism described hereinafter. Each of the discs 37 is provided with a notch 36 in its outer periphery which is dimensioned precisely to receive the locking lug 35a of a shaft locking pawl 33. Each of the discs 37, as will appear hereinafter, may be positioned with its notch or radial slot 36 spaced selectively relative to an assigned zero position of the shaft 2, the position of the notch then corresponding with a desired and predetermined position to which the shaft 2 may be selectively and automatically positioned in the course of the operation of the system. When the tails 34 of the pawls 33 ride on the inner surface of the drum 10, the lugs 35a ride free of the discs 37. Rotation of the cam selector drum 10 causes successive ones of the tails 34 to fall within associated recesses 11 to the slight extent permitted by the lugs 35a which ride then on the outer periphery of associated discs 37. Rotation of the shaft 2 and of the discs 37 locked thereto continues until a slot 36 coincides with a lug 36a of that pawl 34, the tail 34 of which has been presented to an aperture 11, results finally in a lug 35a falling within and engaging a notch 36, thereby locking the disc 37 as well as the entire ring assembly and the shaft 2. Each of the pawls 33 is individually spring pressed by means of one of the spring arms 66 of the multiple cantilever spring assembly 64 which serves to press the tails 34 of the pawls 33 against the inner periphery of the cylinder 10 and to press the lugs 35a into engagement with the stop discs 37. The lock discs 37 may be loosened on the shaft 2 to enable positioning of any one or of several thereof in accordance with predetermined desired positions of shaft 2 by releasing the cam lever 9 which is held within a longitudinal notch 70 in an end of the shaft 2 by means of a pin 71 extending transversely through the locking cam 9 and through an aperture provided transversely of the shaft 2 through the notch 70. The cam 9 is eccentric to its pivot point 72. The shaft 2 is provided further with an axial cylindrical aperture within which extends a pin 73, one end of which extends for a short distance within the slot 70 and the other end of which bears against a flat strip 74 which passes radially through the shaft 2 and which bears against a washer 75 adjacent to the face of the rings 37. Endwise pressure on the axial pin, provided by eccentric cam 9, is transmitted through the flat strip 74 and the washer 75 and serves to lock the position selector discs 37. Release of such pressure unlocks the selector discs 37 to enable positioning thereof during a shaft position predetermining operation.

The lock ring assembly, including the shaft 2, rotates in a pair of ball bearings 80, 81, the forward bearing 80 nesting within a recess provided therefor in the front wall 7, and the rearward bearing 81 in a recess provided therefor in the rear wall 7, suitable axial apertures being provided in the end walls of the pawl assembly of Figures 7 and 8 to permit axial insertion of the disc assembly therethrough.

Figure 9:
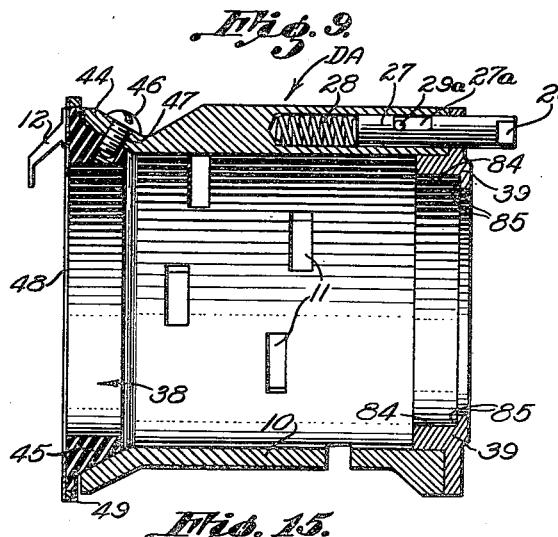
Figure 9 illustrates a further sub-assembly of the assembly illustrated in Figures 5 and 6, taken in longitudinal section.

The pawl assembly is assembled into the completed device and secured thereto by means of the annular extension 50, the side wall 51 and the shoulder 53 which provide a firm base for the pawl assembly with respect to the wall 7. The bearing surface 61 of the pawl assembly (Figures 7 and 8) rides within the inner periphery 84 of the end ring 39 (Figure 9). The thrust bearing 62 of the pawl assembly bears against the annular inward projection 85 of the end ring 39, and a cover plate 86 is secured by means of screws 87 to the bearing 61 to clamp the bearing 61 against axial movement in either direction, while permitting relative rotation of the pawl selector drum 10 about the pawl assembly. (See Figure 5.) The insulating ring 45 of the end assembly 38 provides a further bearing surface riding on the bearing surface 55 of the pawl assembly.

The utilization of sub-assemblies, as above described, enables ready assembly of a completed unit from its component sub-assemblies, facilitating manufacture and dis-assembly for maintenance, while assuring rigid maintenance of the necessary spatial relations between the various components of the system.

Figure 15:
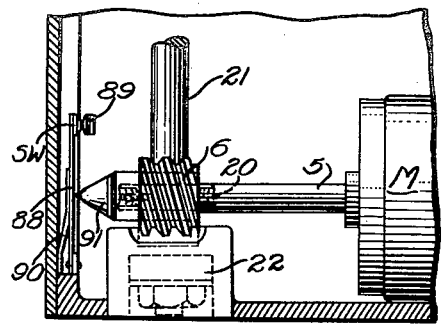
Figure 15 is a view in plan of a torque operated switch, which constitutes a feature of the invention.
Figure 16:
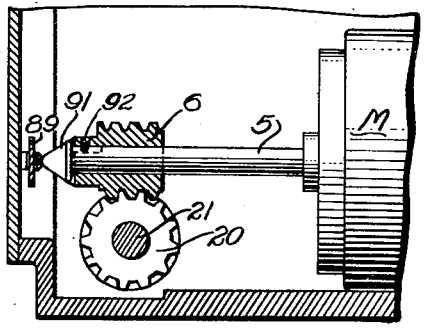
Figure 16 is a view in elevation of the switch of Figure 15.

Reference is now made to Figures 15 and 16 of the drawings, wherein is illustrated a torque responsive switch which plays an important part in the functioning of the system.

Structurally, the torque switch comprises a pair of blades 88, 89, having contacts, normally closed, and spring pressed to closed position by means of a leaf spring 90, the switch blades themselves being secured to the casing of the machine in any convenient manner.

The movable switch blade 88 is movable away from the stationary blade 89 by a conical member 91 fabricated of insulating material and which is secured to the helical gear 6 at its free end. The helical gear 6, itself, is provided with a set screw 92 which extends radially therethrough and freely into a longitudinal spline in the shaft 5, the gear 6 being thus capable of longitudinal movement on the shaft 5, but not of relative rotational motion with respect to the shaft 5.

In one direction of rotation of helical gear 6, to wit, clockwise as seen from the motor M, the reaction of the gear 6 against the gear 21 tends to force the helical gear 6 forward, or away from the motor. In the opposite direction of rotation, on the other hand, the reaction between gear 20 and helical gear 6 tends to force the gear 6 toward the motor. In the latter case, therefore, no force is exerted against the switch blade 88. In the former, however, a tendency exists to force apart the switch blades 88 and 89, the total force exerted being a function of the load on the gear 20. Should gear 20 be locked, for example, the entire turning force of the motor M is translated into translatory motion of gear 6. Should gear 20 rotate freely, the translatory or longitudinal force exerted on gear 6 is far less. In the present application of the switch SW the spring 90 is sufficiently resilient to maintain the switch closed against the pressure exerted by the gear 6, under all load conditions encountered, except one, that being the condition recurring when shaft 2 is locked, upon completion of a shaft positioning cycle. At that moment the load on the gear 20 corresponds with the torque required to drive the ratchet wheel 14 idly past the pawl 26, plus the force required to cause slipping of the friction clutch 30, 32. Prior to locking of the shaft 2 the total load on gear 20 corresponded with the torque required to drive the ratchet wheel 14 only. The former load is adequate and the latter inadequate to actuate the switch blade 89.

*Circuit diagram and operation*

Referring now to Figure 17 of the accompanying drawings, wherein is illustrated a wiring diagram of the invention, the reference numeral 100 represents a selector switch, which may be manually positioned and which may be located remotely from the shaft positioning mechanism proper. In the presently described embodiment of the invention the selector switch 100 comprises fifteen positions, fourteen of which correspond with fourteen shaft position, and the fifteenth of which enables manual positioning of the shaft, independently of the position selecting mechanism.

It will be realized that more or less than fourteen shaft positions may be provided for, if desired, without departing from the spirit and true scope of the invention, by obvious modifications of the structure shown and described.

The selector arm 101 of the switch 100 is connected with one terminal of a source of electrical power 102, shown as positive, and serves to transfer positive potential from the source 102 to a selected one of the contacts 103 of switch 100. A distinct conductor 104 extends from each of the contacts 103, and the conductors 104 may be connected with one or more shaft position selective devices, as desired, over cable connectors, as 16 (Figure 4), the selected conductor serving to control and predetermine a shaft positioning operation at each of the devices. A single selector switch may thus serve to control any desired number of shaft positions simultaneously, and each of the shafts may be actuated to a different, previously determined position in response to any contact selection provided by arm 101.

The conductors 104 serve to interconnect the contacts 103 with further contacts 13 (Figure 5), on a one for one basis, via leads, labeled 105, the contacts 13 forming part of a finder switch 106, having a finder arm 12 (Figure 3). The diagram of Figure 17 is conventionalized and symbolic, the actual structure of the finder switch 106 having been described hereinbefore, in connection with the specific structure of the device.

Upon correspondence of switch positions of selector switches 100 and 106, a circuit is completed for relay R, extending from source 102, over lead 107 to arm 101, thence via the selected contact 103, the selected lead 104, the lead 105 which is connected to selected lead 104, a contact 13, arm 12, contacts $R_1$, relay coil R and back to source 102 over lead 110. Switch SW being open at this juncture, however, no circuit is available for supplying power to motor M.

Operation of control switch 100 to a new position, from a previously selected position, destroys the correspondence between switches 100 and 106, breaking the circuit to relay coil R and deenergizing same; contacts $R_1$, $R_2$, and $R_3$ proceed to up positions, and power is supplied to motor M. The latter, when energized, rotates, driving the cam drum assembly as viewed in Figure 6 of the drawings, counter-clockwise. Mechanical drive is accomplished from motor M over worm 6, gear 20, spindle 21, worm 24 and main drive gear 14, causes the ratchet wheel 14a to engage the pawl 26. Motor M also drives the stop ring discs 37, and the main shaft 2, locked thereto, over the slipping clutch comprising the spider 30 and the annular friction element 32. Upon initial movement of the gear 14 the clutch 30, 32 slips while the selector cam assembly drives, camming the engaged pawl 33 out of engagement with its associated notch 36. Thereafter the rotations of the shaft 2, the stop ring discs 37 and the cam selector drum 10 are continuous for a period, the drum 10 maintaining the pawls 66 out of engagement with the notches 36.

The switch SW, as will be demonstrated, is closed immediately after motor M commences its rotation, preparing a circuit from the normally "hot" lead 108, and via now open contact 111, motor M, stop switch SW, now open contact 112 and lead 109 for driving the motor M in reverse direction immediately upon energization of the relay R.

Until such energization of relay R, however, the motor M continues to drive in its original direction for the purpose of zeroizing the stop ring discs 37 and thereafter driving the selector cam drum assembly and with it the finder switch 12, to the live one of contacts 13.

Since the shaft zeroizing operation may require a complete rotation of the shaft, and of the stop ring assembly locked thereto, the normally open limit switch LS is provided in series with the relay R. The relay R, therefore, remains unenergized until the limit switch LS is closed, despite the fact that prior to such closure the finder arm 12 may encounter a live contact 13. The mechanical structure of the limit switch LS may be best appreciated by reference to Figures 5, 12 and 14, wherein are illustrated the spring contacts 15, normally open, which may be actuated to closed condition by pressure exerted by the actuating member comprising a strip of insulation 111, secured by means of rivets 112 to an arm 113 of a disc which rotates freely about the shaft 2 over a small angle, and which is actuated into switch engaging position by the arm 114, the latter being immovably secured to the shaft 2 and comprising a flat washer 115 with a bent open end 116, located in the plane of the arm 113. Upon arrival of the shaft 2 at zero position the open end 116 of washer 115 engages arm 113 forcing same against one of the contacts 15 of switch LS and closing same. The shaft 2 is now locked in zero position, being prevented from further movement by the engagement between the open end 116 of washer 115 and the arm 13. The clutch, comprising annular friction disc 32 and spider 30, now slips and the selector cam drum assembly continues its motion until the finder switch arm 12 finds a live one of contacts 13.

At that moment a circuit is completed for the relay R from line 107 over switch 100 and switch 106, and via the now closed limit switch LS to the line 110. Relay contacts $R_1$, $R_2$, and $R_3$ move down, relay contact $R_1$ providing a locking circuit for the relay R, paralleling the limit switch LS and contacts $R_2$ and $R_3$ completing the reverse drive circuit for the motor M over stop switch SW.

The motor M now drives in reverse direction, the pawl 26 passing in non-driving relation over the teeth of ratchet wheel 14a, so that the selector cam drum assembly remains stationary in its selected position. The stop ring discs 52 and the shaft 2, however, are driven in a reverse sense by motor M, and the arm 113 is released, permitting the limit switch to open by virtue of its own resilience. Such opening has no effect on the operation at this point because of the alternate or locking circuit provided for relay R by contacts $R_1$.

The selector rings 37 are driven by the motor M over the slipping clutch 30, 32 until the drum is locked by the selected one of the pawls 47, and thereafter the shaft 2 is locked in its selected and predetermined position. At this same moment the torque required to be exerted by the motor M to cause the clutch 30, 32 to slip causes opening of the torque responsive stop switch SW, opening the motor circuit and completing a cycle of operations of the device.

Since fourteen switch positions are provided, corresponding with fourteen pawl selecting apertures 11, it is possible to select any one of fourteen predetermined shaft positions with the device comprising the present invention. A fifteenth switch position is provided, however, which corresponds with an angular position about the pawl selector drum 10 at which is provided no aperture 11, as has been explained in detail hereinbefore. Selection of this switch position, accordingly, results in positioning of pawl selector drum 10 such that all shaft locking pawls 33 are maintained in shaft unlocking position, and the shaft may therefore be freely actuated manually to any desired position.

When it is desired to modify the relation between any selected selector disc 37 and the shaft 2, in order to change the predetermined shaft position corresponding with that switch contact 103 which corresponds with the selected selector disc, the switch arm 101 is caused to select the given disc 37 and the mechanism permitted to complete a shaft positioning cycle. At the conclusion of the shaft positioning cycle the selected disc is locked with respect to the frame of the device by its associated pawl 33. The disc lock cam lever 9 is now released, destroying the locked relation between the selected disc 37 and the shaft 2. The shaft 2 may then be positioned manually to a new position, and the lever 9 re-locked, which establishes a new relation between the selected disc 37 and the shaft 2 and consequently a new predetermined position for shaft 2 corresponding with the switch contact 103, first mentioned.

What I claim and desire to secure by Letters Patent of the United States of America is:

1. A shaft positioning mechanism, comprising a reversible drive motor having a reversible armature, a main shaft to be positioned, a mechanical coupling between said armature and said main shaft comprising a worm driver, a worm pinion, and a slip clutch, shaft position control means driven by said armature, a uni-directional clutch coupling said armature and said shaft position control means in driving relation, means mounting said worm driver for translatory motion selectively between a first and second position, means biasing said worm driver to said first position, rotation of said main shaft in zeroizing direction in response to said drive motor further tending to drive said worm driver to said first position, means for actuating said motor to drive said main shaft in zeroizing direction and said shaft position control means to a predetermined position following zeroizing of said main shaft, with consequent slippage of said slipping clutch, means for then reversing said armature and actuating said main shaft via said worm driver, worm pinion and slip clutch to a position selected by said shaft position control means and there locking said main shaft, said means biasing said worm driver so arranged that further rotation of said worm driver after locking of said main shaft and despite consequent slipping of said slip clutch overcomes said means biasing said worm driver to said first position, a switch in circuit with said motor, and means responsive only to motion of said worm driver to said second position for actuating said switch to circuit de-energizing condition.

2. The combination in accordance with claim 1 wherein said switch comprises a stationary contact and a movable contact, spring means mounting said movable contact and biasing said movable contact to a predetermined position with respect to said stationary contact, said spring means constituting said biasing means for said worm driver.

3. Shaft positioning apparatus comprising a multi-contact selector switch, a multi-contact control switch, a plurality of pawls, a pawl selector cam drum, a motor, uni-directional clutch means responsive to said motor for driving said selector cam drum and said selector switch in synchronism, a shaft, bi-directional slipping clutch means responsive to said motor for actuating said shaft, means establishing electrical conduction between coresponding contacts of said selector switch and of said control switch, means responsive to failure of correspondence of positions of said switches for energizing said motor and for driving said shaft and said drum and said selector switch in a first direction, means responsive to arrival of said shaft at a predetermined zero position for preparing a motor reversing circuit, means responsive to arrival of said selector switch in correspondence with said control switch for completing said reversing circuit and causing reverse driving of said motor and reverse driving of said shaft via said bi-directional slipping clutch means, means responsive to correspondence between shaft position and selector switch position and comprising said plurality of pawls for locking said shaft, locking of said shaft loading said motor to a predetermined extent, a torque responsive switch actuable by said motor only in response to said reverse driving, and means biasing said torque responsive switch to be actuated by said motor only while said shaft is locked and said motor is reverse driving and despite slipping of said bi-directional slipping clutch, said switch in circuit with said motor.

CHARLES H. ISAACS.

REFERENCES CITED

The following references are of record in the file of this patent:

UNITED STATES PATENTS

| Number | Name | Date |
|---|---|---|
| 1,930,159 | Crilly | Oct. 10, 1933 |
| 1,959,292 | Morris | May 15, 1934 |
| 2,235,216 | Koberich et al. | Mar. 18, 1941 |
| 2,391,470 | May | Dec. 25, 1945 |
| 2,417,528 | Ten Cate et al. | Mar. 18, 1947 |
| 2,423,588 | Elliott | July 8, 1947 |
| 2,461,261 | Drisko | Feb. 8, 1949 |
| 2,495,917 | Miner | Jan. 31, 1950 |